Dec. 21, 1965     L. J. NOWAK, JR     3,224,515
POWER DISCHARGE FOR NET WEIGHER AND METHOD OF WEIGHING
Filed March 22, 1963     5 Sheets-Sheet 1
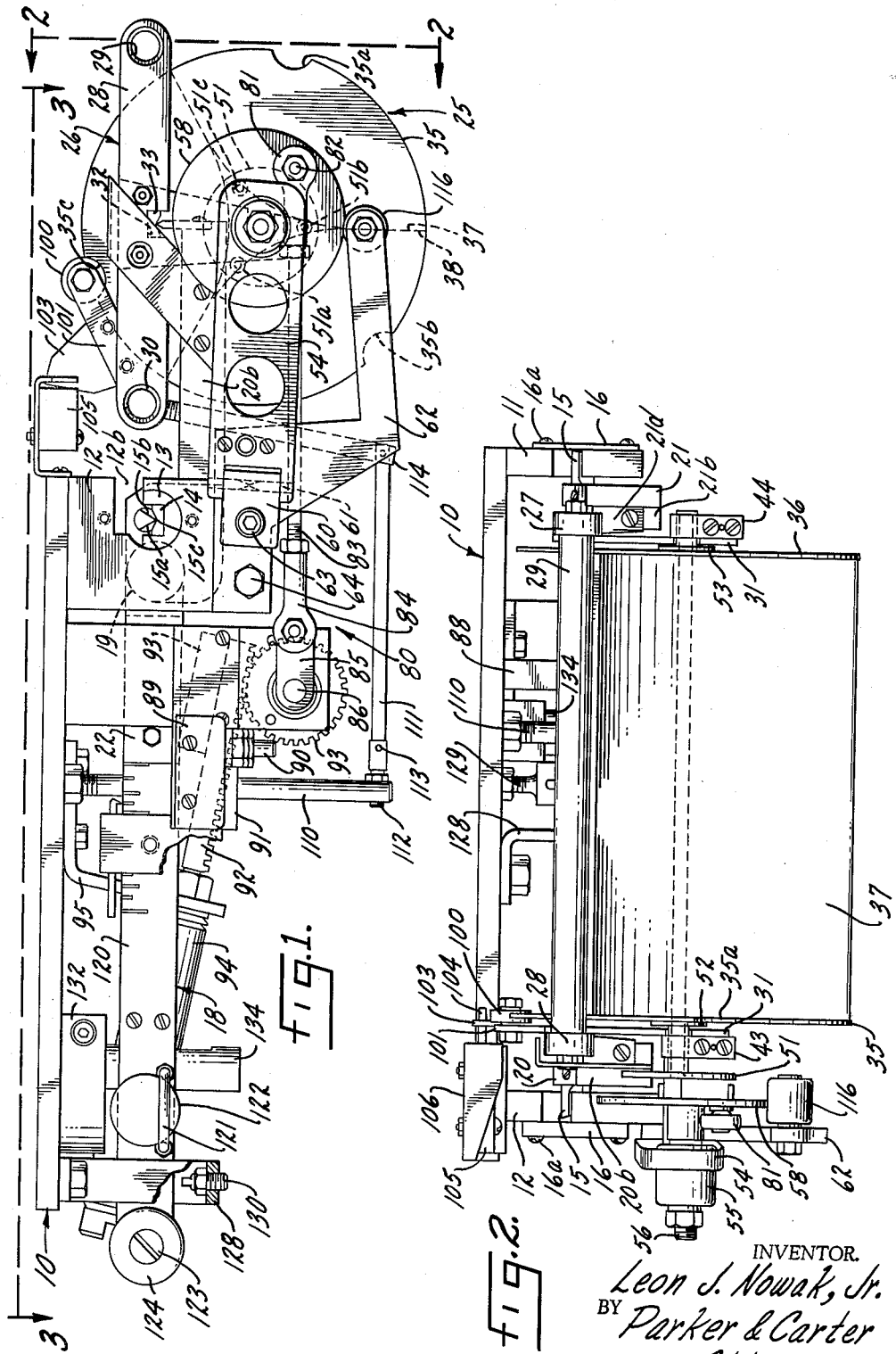
INVENTOR.
Leon J. Nowak, Jr.
BY Parker & Carter
Attorneys.

Dec. 21, 1965    L. J. NOWAK, JR    3,224,515
POWER DISCHARGE FOR NET WEIGHER AND METHOD OF WEIGHING
Filed March 22, 1963
5 Sheets-Sheet 2
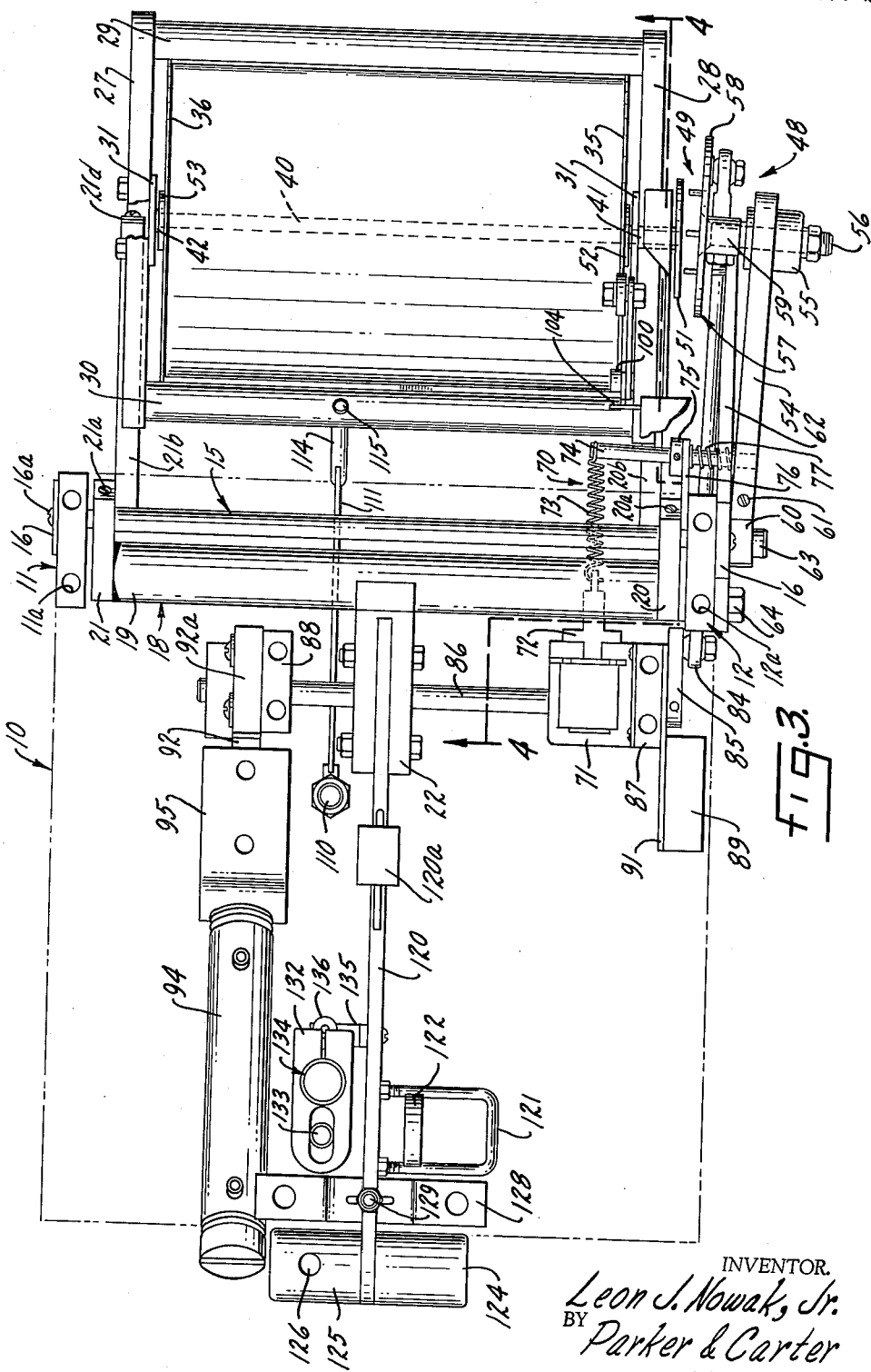
INVENTOR.
Leon J. Nowak, Jr.
BY Parker & Carter
Attorneys.

Dec. 21, 1965     L. J. NOWAK, JR     3,224,515
POWER DISCHARGE FOR NET WEIGHER AND METHOD OF WEIGHING
Filed March 22, 1963     5 Sheets-Sheet 3
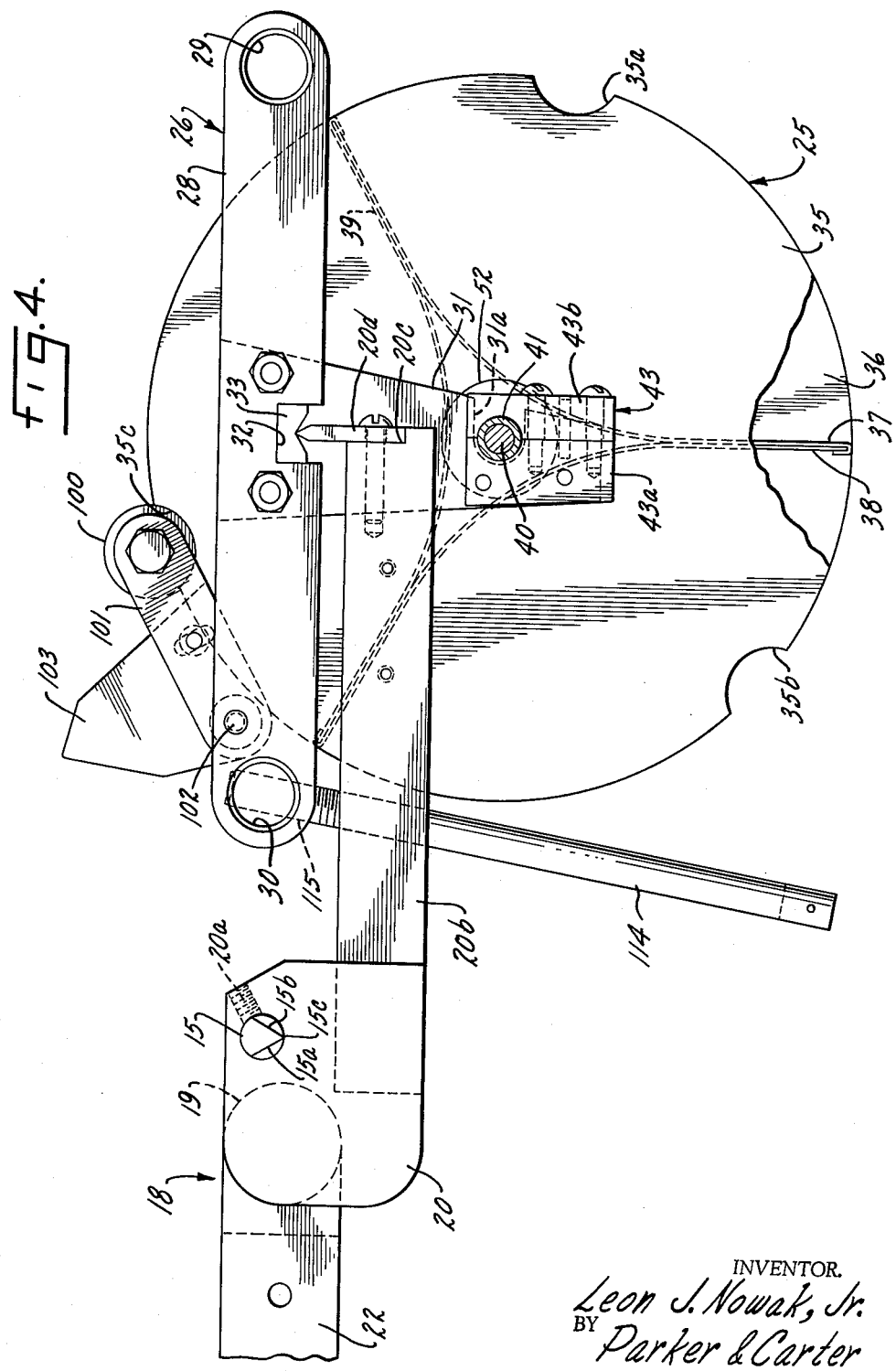
INVENTOR.
Leon J. Nowak, Jr.
BY Parker & Carter
Attorneys.

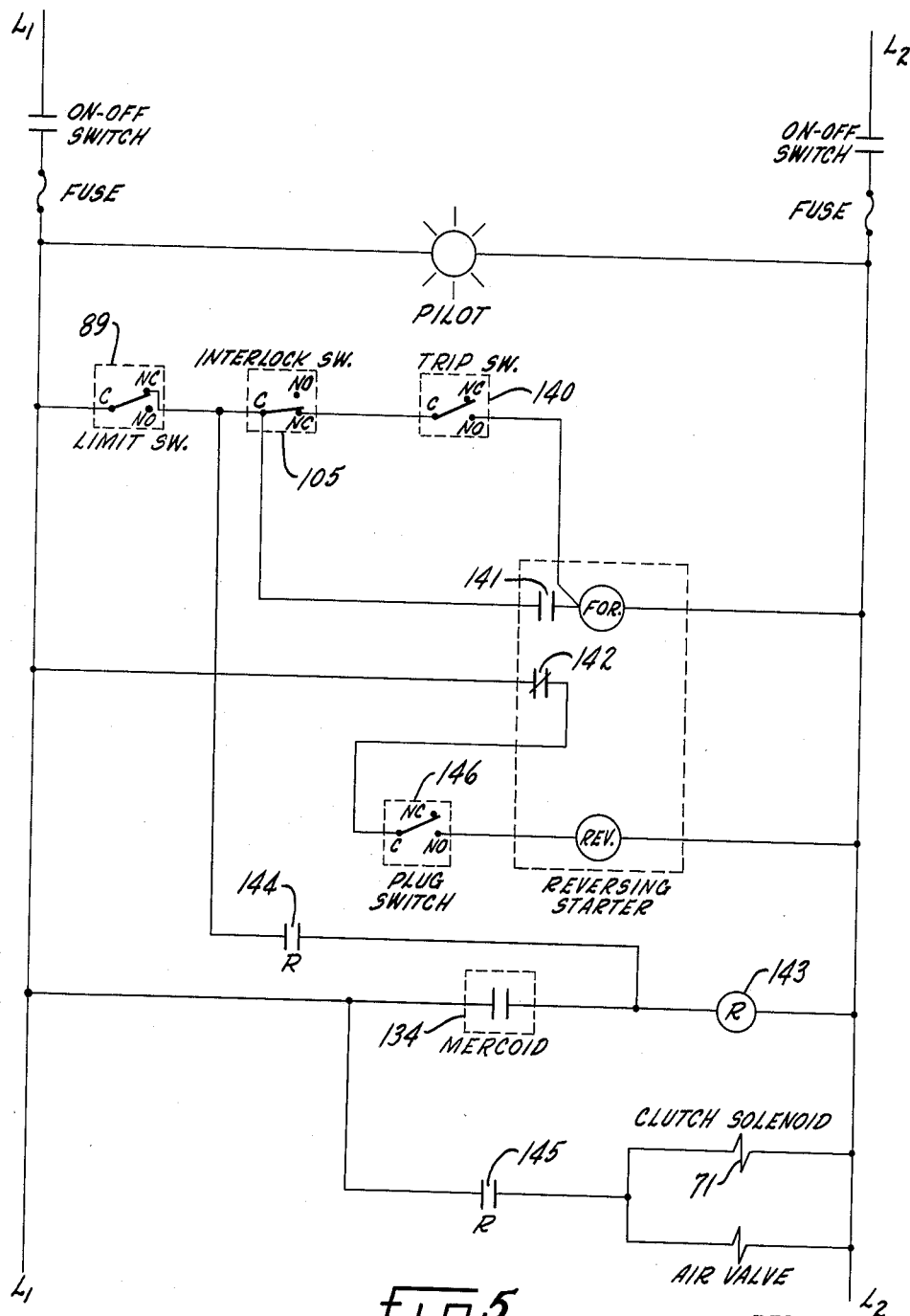

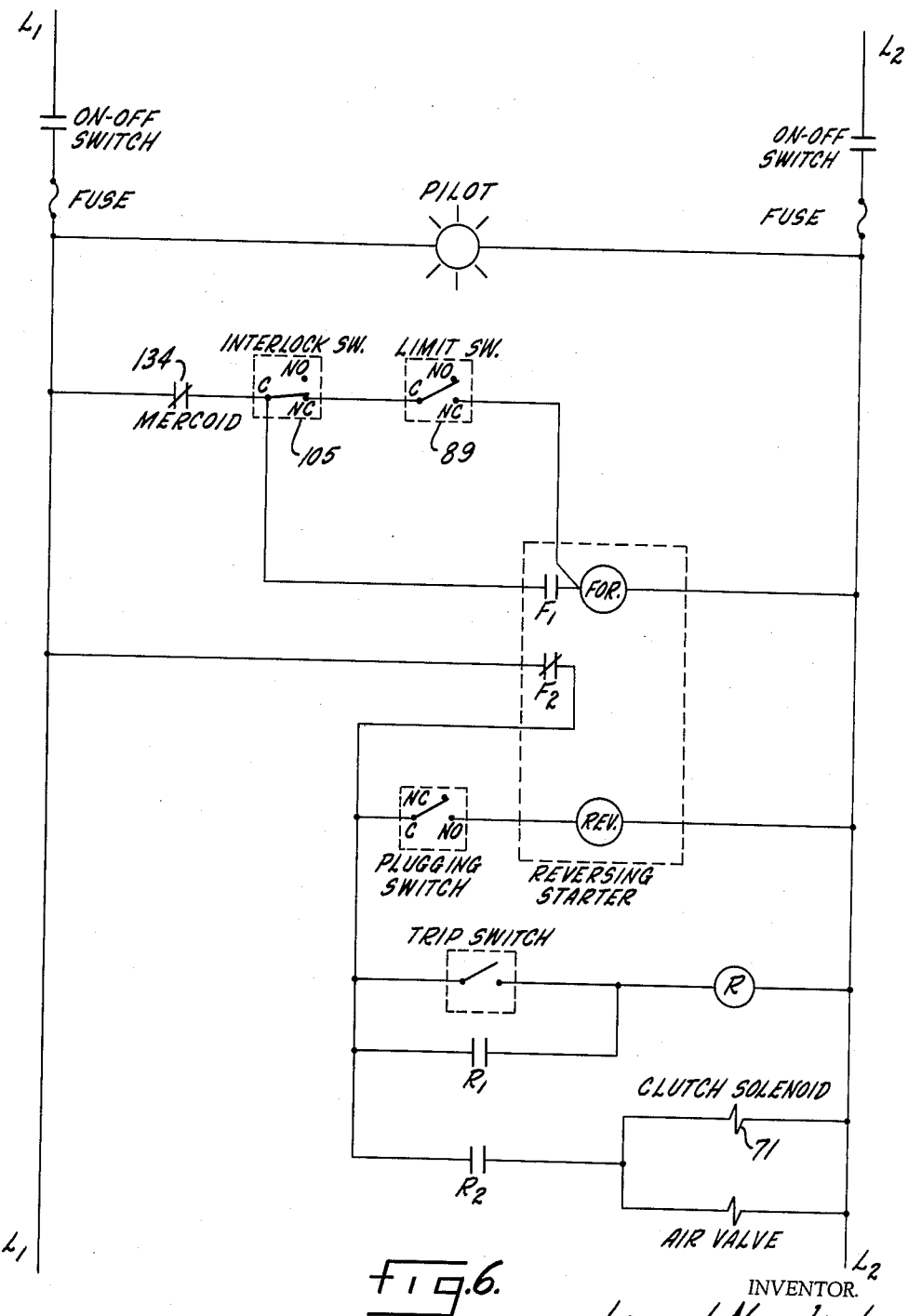

United States Patent Office 3,224,515
Patented Dec. 21, 1965

3,224,515
POWER DISCHARGE FOR NET WEIGHER AND
METHOD OF WEIGHING
Leon J. Nowak, Jr., Park Ridge, Ill., assignor, by mesne assignments, to Blaw-Knox Company, Pittsburgh, Pa., a corporation of Delaware
Filed Mar. 22, 1963, Ser. No. 267,195
24 Claims. (Cl. 177—1)

My invention relates in general to rotary net weighers and a method of weighing.

Net weigher hoppers are usually equipped with bottom gate discharges. When such hoppers handle materials having physical characteristics that retard a rapid complete discharge from the weigh bucket, particularly sticky materials, difficulties are often encountered in obtaining complete discharge of all materials prior to the return of the bottom gate of the weigh bucket. A further problem is that some hard to handle materials, such as chewing tobacco, may remain positioned in a manner which prevents complete closing of the bottom gate. Rotary net weighers are also used for light, fine materials that flush through and these materials also raise problems.

My invention relates to a compartmented rotary weigh bucket and a method of weighing, which overcomes the aforementioned disadvantages of conventional weighers. Although rotary weigh buckets of the paddle wheel type are known to the art, they do not, as a general rule, lend themselves to extremely light weights. Consequently, the types of material they can handle are limited. Sticky materials, such as chewing tobacco, cannot be feasibly handled by conventional rotary weigh buckets, most of which are gravity actuated.

In my rotary bucket weigher the weigh bucket is a multi-compartment wheel, preferably a three compartment wheel. When each compartment is in a material receiving position it is centered at the top of the wheel. Instead of gravity I employ a simple reciprocal power action which moves the compartments one position per cycle of my weigher.

"Cycle" as used in this application denotes one complete weigh of material; that is, the charging, weighing, and discharging of material from one compartment in my multi-compartment rotary weigh bucket.

Accordingly, one of the primary objects of my invention is to provide a rotary bucket weigher which can quickly and accurately weigh uniform batches of material at a rapid rate. As a result a minimum of down time occurs which, in this application, is defined as that period of time in which material is not actually being weighed.

Another object is to provide a rotary bucket weigher which quickly and accurately weighs uniform batches of material which may either be continuously or controllably charged to the weigher.

A further object is to provide a weigher having a multi-compartment rotary bucket and a simple reciprocal power action which moves the bucket compartments one position per revolution.

A further object is to provide a rotary bucket weigher as above described in which the speed of movement of the buckets is gradually accelerated and gradually decelerated, thereby minimizing shocks and vibrations which prolongs the life of the pivots and knife edge and preserves the accuracy of the weigher.

Another object is to provide a weigher which is practically unlimited as to the size of batch it will weigh, but is especially effective for smaller weights, generally measured in ounces.

Yet another object is to provide a rotary bucket weigher which is readily adaptable to many kinds of material such as grain, flour, chewing tobacco, etc.

A further object is to provide a method of power discharging in which the speed of movement of the parts is gradually accelerated and gradually decelerated, whereby shock and vibration in the system is minimized even during very rapid weighing.

A further object is to provide a method of weighing as above-described in which the acceleration and deceleration of the parts is a function of simple harmonic motion.

Other objects and advantages of the invention will become apparent upon a reading of the following description of the invention.

The invention is illustrated more or less diagrammatically in the accompanying drawings wherein:

FIGURE 1 is a side elevation with parts broken away for clarity;

FIGURE 2 is an end view taken substantially along the line 2—2 of FIGURE 1;

FIGURE 3 is a top plan view with parts broken away for clarity taken substantially along the line 3—3 of FIGURE 1;

FIGURE 4 is a view taken substantially along the line 4—4 of FIGURE 3;

FIGURE 5 is a schematic diagram of an electric circuit which may be employed in my invention; and FIGURE 6 is a schematic diagram of another electric circuit for use in a slightly different mode of operation which may be employed in my invention.

Like reference numerals will be used to refer to like parts throughout the following description of the invention.

The main frame is indicated at 10 in each of FIGURES 1, 2 and 3. Although the main frame has been illustrated as a flat plate in this instance, it will be understood that it is quite within the scope of my invention to provide simple structure for mounting my weigher in any desired operable position from any suitable supporting structure.

A pair of scale pivot brackets 11, 12 are secured to the main frame 10 by any suitable means, such as bolts 11a, 12a, and depend downwardly therefrom. Each scale pivot bracket is cut away, as at 12b for example, to receive an M bearing holder 13. In this instance the bearing is roughly semi-circular with a recess formed in its midsection. An upwardly opening M bearing 14 is received in the bearing holder recess. While an M bearing has been shown, it will be understood that any bearing suitable for supporting a knife edge or other equivalent structure may be used within the scope of my invention.

A center pivot is indicated generally at 15. In this instance the center pivot is a solid shaft, the ends of which have been milled as at 15a, 15b, to form knife edge 15c. The knife edge rests in the crotch of the M bearing 14. An adjustable pivot stop is indicated at 16, as best seen in FIGURES 2 and 3. Actually a pair of plates, one at each end of the center pivot, should be used, but the right side plate has been omitted from FIGURE 1 for purposes of clarity. Each plate is secured to an associated scale pivot bracket by any suitable means such as screws 16a.

A lever, shown best in FIGURES 1 and 4, is indicated generally at 18. The lever consists essentially of a hollow tubular member 19 which is welded, at its ends, to end plates 20 and 21. Each end plate is apertured to enable the center pivot 15 to pass through it. Set screws 20a, 21a, secure the plates 20 and 21 respectively, and thereby the lever, to the center pivot so that the lever will rotate with rotation of the center pivot. A pair of forwardly extending arms 20b and 21b are secured to the inside vertical faces of end plates 20 and 21 by any suitable means. As best seen in FIGURE 4, arms 20b, 21b, are at a substantially lower elevation than the tubular member 19. Each arm is notched at its forward end, as at 20c, to receive end pivot 20d, 21d. Each end pivot is secured to its associated arm by any suitable means and supports a frame which will be described in detail hereinafter. A U shaped socket member 22 is welded or otherwise suitably secured to the rear surface of tubular member 19.

A rotary weigh bucket is indicated generally at 25, and a weigh bucket supporting frame at 26.

The bucket frame includes left and right side members 27, 28, and front and rear tubular transverse members 29, 30. A combination thrust plate and bucket bearing holder 31 is secured to the inside face of each side member and extends downwardly therefrom. Each combination thrust plate and bucket bearing holder takes the form roughly of an inverted truncated cone which has a recess 31 cut in its leading edge adjacent its lower end for a purpose which will appear hereafter. The lower edge of each side member 27, 28, is recessed as at 32 to receive a bearing 33. In this instance a downwardly opening M bearing 33 is received in the recess but it should be understood that within the scope of my invention any suitable bearing may be employed. The entire bucket frame assembly rests upon the end pivots 20d, 21d, and is balanced thereon.

Bucket 25 consists essentially of a pair of circular end plates 35, 36 and three internal walls 37, 38 and 39. As best seen in FIGURES 1 and 4, the leading edge of each wall, which is formed of sheet metal, is bent back upon itself and the trailing edge of the next successive wall sheet is received in the notch formed by the turned-back edge. The result is that the rotary bucket is divided into three symmetrical compartments of equal capacity, each compartment occupying 120 degrees of the entire sectional area of the bucket. Right end wall 35 is notched as at 35a, 35b and 35c.

A bucket shaft is indicated at 40. A pair of end bearing sleeves, one for each end of the bucket shaft, is indicated at 41 and 42. A pair of weigh bucket bearings are indicated at 43, 44. In this instance, the bearings are of split construction with the halves 43a, 43b being joined together with screws or other suitable fasteners, as best seen in FIGURE 4. The bearings are clamped to bearing sleeves 41, 42, which in turn are press fitted or otherwise suitably secured to the bucket shaft 40. The bearings 43, 44 are secured to the outside vertical face of the bucket bearing holders 31.

The bucket rotating mechanism, indicated generally at 48, includes a dog clutch 49. The dog clutch consists essentially of a combination clutch plate and the end bearing sleeve 41 which is press fitted or otherwise suitably secured to the bucket shaft 40. The plate has an outside collar 51 in which three equidistantly spaced apertures 51a, 51b and 51c are formed. The clutch plate also includes an internal collar 52, best seen in FIGURE 4, which bears against right end of wall 35 of the bucket. The corresponding washer or flange member 53 press fitted to left bearing 42 similarly bears against the outside surface of wall 36. The internal collar 52 and flange 53 prevent transverse movement of the rotary bucket.

The other half of the clutch includes a clutch arm 54 which carries, at its forward end, a bearing 55. The bearing, in turn, receives the threaded shank 56 of the other half 57 of the dog clutch. As best seen in FIGURE 3, said other half 57 includes a cam clutch plate 58 having an outwardly extending sleeve 59 welded thereto through which the threaded shank 56 extends. A plurality of studs, not numbered for purposes of clarity, extend inwardly from the inner face of clutch plate 58 and are aligned with the dog holes 51a, 51b and 51c on inner plate 51. A nut and spacer washers or other suitable spacing means maintain the outer clutch plate 58 any desired fixed distance from clutch arm 54.

Clutch arm 54 is pivotally connected to clutch arm pivot block 60 by a pivot screw 61. The pivot block is secured to the left end of support arm 62 by a shoulder screw 63. The support arm in turn is bolted to the right scale pivot bracket 12 by a fastener 64.

The clutch arm 54 is swung into and out of locking engagement with clutch plate 50 by the spring mechanism indicated generally at 70. The spring mechanism includes a solenoid 71 whose armature 72 is connected to the left end of a coil spring 73. The right end of the coil spring is secured to the innermost end of a clutch arm stud 74. The outer end of the stud is received in clutch arm 54. A set collar is indicated at 75. Its position longitudinally along the clutch arm 74 may be set by means of a set screw which is not numbered for purposes of clarity. The collar bears against an abutment plate 76 which is welded to the inside surface of the right scale pivot bracket near its forward end. The abutment plate is apertured to receive the clutch arm stud 74. A second spring, in this instance a coil spring, is indicated at 77. Its inner end bears against the abutment plate 76 and its outer end against the clutch arm 54. Spring 77 is so biased that when the clutch is disengaged, as in FIGURE 3, clutch arm 54 is swung outwardly about pivot screw 61. Although a coil spring has been illustrated it should be understood that within the scope of my invention any suitable spring means may be utilized.

Linkage for rotating the rotary weigh bucket 25 in 120° increments of movement is indicated generally at 80.

The linkage comprises a rod end 81 whose outer apertured end is connected to clutch plate 58 by a ball pivot assembly 82. The inner end of the rod end is threadably connected to a connecting link 83, which in turn is connected at its left end to a similar rod end 84. Rod end 84 is connected by a ball and socket assembly to crank arm 85, which is integral with crank shaft 86. The crank shaft is journaled in a pair of clutch pivot brackets 87 and 88. A micro-switch 89 having an actuating button extending downwardly therefrom as at 90 is secured to pivot bracket 87 by means of a mounting bracket 91. The actuating button 90 is so positioned that rod end 84 will depress it when it moves 180° clockwise from the position illustrated in FIGURE 1.

Shaft 86 is rotated by rack 92 which engages pinion 93. The pinion is secured to shaft 86 at a location directly beneath rack 92 and its overlying rack guide 92a, best shown in FIGURE 3. The rack guide is merely a square bar which is bolted at an angle to the outside surface of clutch pivot bracket 88. The left end of the rack 92 is threadably connected to the piston rod of a spring loaded air cylinder 94. An air cylinder mounting bracket 95 maintains the air cylinder and rack at the proper angle of inclination with respect to the pinion 93.

Rotation of bucket 25 precisely 120° is assured by engagement of bearing 100 with each of notches 35a, 35b and 35c successively. Bearing 100 is carried by bucket locking arm 101, which is pivoted to side member 28 as at 102. Arm 101 also carries a limit switch cam 103, which is so positioned as to actuate limit switch lever 104, which protrudes from micro-switch 105. Micro-switch 105 is supported in the illustrated position of FIGURES 1 and 2 by a limit switch mounting bracket 106.

A check load system of counter balance weights to accommodate an off-center load in a compartment of the rotary bucket is illustrated best in FIGURE 1. The check load system comprises essentially a parallelogram linkage which always results in a point load at knife edges 33 upon which the bucket frame work rests. The system includes a downwardly depending check rod stud 110 which is secured at its upper end to main frame 10. The left end of check rod 111 is secured to the lower end of the check rod stud 110 by an adjustable check rod stud 112 and a pin 113. The right end of the check rod is pivotally connected to a second check rod stud 114 whose upper end is secured to tubular member 30 as at 115. The parts are so dimensioned that a line drawn between the left end of check rod 111 to the crotch of M bearing 13 is parallel at all times to a line drawn between the intersection of check rods 111 and 114, and the crotch of M bearing 33.

A roller 116, in this instance a conventional bearing, is carried by the outer end of support arm 62 and bears against the combined clutch and cam plate 58 in rolling engagement as best seen in FIGURE 1. The function of roller 116 is to provide minimum friction between arm 62 and clutch plate 58.

A poise bar is indicated at 120. The right end of the poise bar is bolted to the U shaped socket member 22 carried by tubular member 19. A weight holder is indicated at 121 and any suitable weight at 122. The left end of the poise bar is apertured to receive a bolt 123 which extends through and attaches inside and outside balance weights 124, 125, respectively, to the poise bar. An additional adjustment weight screw 126 may be provided if desired. A poise weight is indicated at 120a.

A beam stop bracket is indicated at 128. An upper beam stop 129 is threaded into main frame 10 and lower beam stop 130 is threaded in the trough portion of bracket 128. Each of the beam stops includes a flattened elongated head which is positioned substantially perpendicularly to the vertical plane of the poise bar. The arc of swing of the poise bar can be readily regulated by adjusting the position of the beam stops 129, 130.

A mercoid switch mounting bracket is indicated at 132. The bracket is clamped to main frame 10 by any suitable fastener 133 received in a slot in the left end of the bracket. A mercoid switch assembly is indicated generally at 134. A magnet support carried by poise bar 120 is indicated at 135. The support carries a mercoid magnet 136, which cooperates with the mercoid 134 in a manner which will be explained hereafter.

A wiring diagram is shown in FIGURE 5. The components there shown diagrammatically carry the same reference numerals as do their physical counterparts in FIGURES 1 through 4. The arrangement and operation of the wiring diagram will become apparent upon a description of operation of the weigher.

The use and operation of my invention is as follows:

Assume that a 3 ounce batch weight is desired. A fixed weight 122 of less than 3 ounces, for example, 2½ ounces, is placed in weight holder 121. The poise weight 120a on beam 120 would then be set to compensate for the in-flight material, in this instance, ½ ounce.

It will be understood that my net weigher will frequently, if not invariably, be used in conjunction with other equipment, such as a power discharge or feeding device. My net weigher might, for example, be used as part of a system for weighing out 3 ounce batches of material. In this event, a feeding device, such as the bi-directional feeder illustrated and described in co-pending application Serial No. 217,055, assigned to the assignee of this application, would deliver a uniform flow of material into uppermost compartment 39 of my net weigher. My net weigher, after weighing out a 3 ounce batch of material, would then discharge into a packaging machine. The operation of my net weigher will generally be correlated to the operation of the feeder, or power discharge and, in the embodiment described herein, is also correlated with the operation of the packaging machine.

The power discharge device will usually include an electric motor which may, for example, function to open and close a gate or hopper which permits, and then shuts off, flow of material into my rotary bucket weigher. In the following description of operation an electric motor associated with the power discharge, a conventional arrangement, is assumed for purposes of description.

Referring specifically to FIGURES 1 and 5, and in the first instance to FIGURE 5, power is supplied to my net weigher by closing the On-Off switch in lines $L_1$ and $L_2$.

This energizes the pilot light which indicates to the operator that the machine is ready to operate. At this time the various switches and contacts in the circuit are in their positions indicated in FIGURE 5.

Trip switch 140 is closed by an outside activator to start a cycle. The activator might for example be a cam on a packaging machine; the cam being so arranged as to close the switch when the preceding package of material has left the machine, or more preferably, when an empty package is in position to receive material from my rotary bucket. Preferably the trip switch is spring loaded so that it is merely impulsed by the outside activator and thereby closes momentarily and then opens, thereby furnishing a signal to my weigher which initiates operation.

Closure of trip switch 140 completes a circuit thru normally closed limit switch 89, normally closed interlocking switch 105, and the forwarding coil FOR., of the reversing starter for the motor. Closure of the trip switch also closes normally open contact 141 and opens normally closed contact 142 in a conventional manner. Contact 141 is a holding contact which maintains the circuit thru the forwarding coil after the trip switch returns to its indicated, normally closed, position.

As the rotary bucket 25 drops vertically downwardly the lever 18 pivots about knife edge 15c. When a predetermined weight of material is deposited in the compartment formed by interval wall 39, which will hereafter be referred to as compartment 39, the left end of lever or poise bar 18 rises to a position in which magnet 136 closes mercoid switch 134.

Closure of switch 134 activates relay coil 143 which in turn closes contacts 144 and 145, energizes air valve solenoid and the clutch solenoid 71, which in turn immediately operates plunger 72 (see FIGURE 3).

Retraction of plunger 72 swings clutch arm 54 about pivot screw 61 and against coil spring 77. Movement of clutch arm 54 inwardly, as viewed in FIGURE 2, causes the studs on cam clutch plate 58 to engage corresponding holes 51a, 51b, 51c on clutch plate 51. Clutch plate 51 is positioned with its holes in alignment with the studs by means of cam roller 100 resting in slot 35c.

Immediately after engagement of the clutch halves 51 and 58, rack 92 moves in an outwardly extending direction. It will be understood that the double acting air cylinder 94 is controlled by a solenoid valve in its inlet and outlet lines which, when in one position, causes extension of the rack 92 and, in the other position, causes retraction of rack 92.

Extension of rack 92 rotates pinion 93, which in turn rotates crank arm 85, since the arm is integral with crank shaft 86. Rotation of arm 85 moves the bucket rotating linkage 80, including connecting link 83, from its FIGURE 1 position to a position in which it is axially aligned with its FIGURE 1 position, except it is displaced rearwardly twice the length of arm 85 by virtue of movement of arm 85 180° in a clockwise direction. Movement of the linkage rotates clutch plate 58, and thereby the bucket, 120° since clutch plate 58 is connected to clutch plate 51 which is integral with the bucket. Although a 3 compartment bucket has been illustrated and described, it should be understood that a bucket of any suitable number of compartments may be employed. The operation of the bucket actuating mechanism can generally be described as rotating the bucket that portion of a complete revolution equal to one over the number of compartments in the bucket.

It should also be noted that movement of the bucket is a function of simple harmonic motion since that is the rate of travel of a projection of the point of connection of arm 85 to rod end 84 on the horizontal axis of pinion 93. That is, the first increment of movement of the bucket from FIGURE 1 position increases relatively gradually from minimum velocity, in this instance, zero velocity, because arm 85 is moving generally downwardly and the horizontal component of movement of connecting rod 84 is much slower than the peripheral movement of the point of connection between arm 85 and receptacle 84.

During the next increment of movement of arm 85, rod 83 moves relatively rapidly because the point of connection between arm 85 and receptacle 84 moves substantially parallel to the horizontal.

The last portion of the travel of arm 85 causes rod 84 to move at a much slower rate. In effect, rod 84 gradually decelerates from maximum velocity at the 6:00 o'clock position, to, in this instance, zero velocity.

During the dumping step, switch 134 opens as the left end of the lever moves downwardly away from magnet 136 by positive cam action of cam surface 58 but relay 143 is held in thru contact 144.

At the end of the dump, limit switch 89 is opened by impingement of the knobby end of rod end 84 against button 90.

Opening of limit switch 89 breaks the holding circuit 144 thru relay 143, and relay 143 drops out. As soon as relay 143 is de-energized, contacts 144 and 145 open, and the circuit thru clutch solenoid and air valve solenoid is also open. De-energization of the air valve solenoid causes rack 92 to retract and it returns to the FIGURE 1 position. Since the clutch halves are engaged only during the dump, the bucket rotates clockwise only. Energizing of the clutch solenoid enables spring 77 to disengage the clutch halves.

Gradual acceleration of movement of the bucket from minimum velocity to maximum velocity is of great importance. The gradual rate of change of velocity reduces shocks and vibrations in the system and consequent wearing and looseness of the components. The avoidance of shocks is especially important in reducing the wear on the various knife edges. Experience has shown that the knife edges tend to wear, and lose their accuracy, very much more rapidly when they are subjected to shock and vibration at the limits of the movement of the poise bar.

Referring again to FIGURE 5, opening of limit switch 89 also breaks the circuit thru the forwarding coil of the motor. As soon as the forwarding coil is de-energized, contact 141 opens, and contact 142 closes.

The reversing coil of the reversing starter is energized thru plugging switch 146 which may be associated, for example, with the motor controlling the power discharge apparatus. Energization of the reversing coil exerts a reversing torque, in other words, a braking effect, on the motor which acts to slow the motor until the plugging switch drops out. Dropping out of the plugging switch can be controlled by any suitable means whose operation is not essential to the understanding of the invention.

My rotary bucket weigher is now in position to receive another batch of material from the power discharge device and the above cycle will be repeated as soon as an impulse or signal is received from an outside activator, and trip switch 140 again activated.

Interlock switch 105 will open and close each time the bucket rotates 120°. This is due to the depression of the switch by cam 103 caused by the swinging of arm 101 due to bearing roller 100 dropping into notches 35a, 35b, and 35c as it rides along the bucket periphery. During that portion of the time the interlock switch is open the circuit will be unaffected because the forwarding coil is held in by contact 141 and relay 143 by contact 144. The interlock switch 105 insures complete rotation of the bucket before the clutch can be de-energized or a new cycle started.

In the above described mode of operation, the weigher has been described as operating "on stream." Closure of the circuit which follows immediately after receipt of impulses from trip switch 140 discharges or dumps the bucket and the power feed is stopped. Any uneven dribble, in effect the "in-flight" material, becomes an unweighed portion of the next weight.

In order to improve accuracy, it should be understood that the edges of the compartment walls 37, 38, 39, may have knife edges formed thereon in order to obtain a sharp cut-off of material into the compartment.

The purpose of providing a camming action to cam clutch plate 58 is to lock poise bar 18 against stop 130 at the end of the dump movement and thereby prevent the poise bar from bouncing on the stop. Bouncing of the poise bar is undesirable, especially on small weights, because switch 134 might be tripped if the poise bar bounces high enough. Knife edge wear would increase if the poise bar bounces. Perhaps the greatest advantage of eliminating bouncing of the poise bar 18 is the great speed of weighing thereby made possible. Forty-six weighs per minute, and under some circumstances over fifty weighs per minute, have been achieved.

The circuit of FIGURE 6 may be utilized when it is desired to cut off the flow of material into the bucket by stopping the feed or flow of material at its source. In the mode of operation exemplified by the FIGURE 5 circuit, by way of contrast, the cut off of feed to each compartment in the receptacle occurs by movement of the receptacle. In other words, in the FIGURE 6 embodiment, the feed is stopped before the weight is rotated and dumped. That is, everything discharged from the source of feed goes into one compartment of the bucket and there is no carry over of feed from bucket to bucket. In the FIGURE 5 embodiment, that material in suspension at the time the rear edge of the compartment receptacle crosses the path of feed flow falls into the next bucket and forms a portion of the next weight.

The FIGURE 6 mode of operation lends flexibility to the machine. The speed of rotation of the bucket can be slow, especially if a rapid cut off of feed from the feed source can be obtained. A vibrator-type feeder may be used for example. This mode of operation is especially in connection with light, powdery or dusty material such as baking powder or cocoa.

Referring specifically to FIGURE 6, the description of operation will pick up at that point in the operating cycle of the machine at which the receptacle compartment is substantially full, poise bar 18 is moving clockwise about pivot 15c, and mercoid switch 134 opens.

Before switch 134 opens contact $F_1$ has been closed, contact $F_2$ is open, and limit switch 89 is open. The forward coil FOR. of the feed device motor has been energized and a flow of feed has occurred.

The opening of switch 134 breaks the circuit thru the forwarding coil FOR, and the feed stops.

Simultaneously with the opening of switch 134 and de-energization of the forwarding coil, contact $F_1$ opens and contact $F_2$ closes.

Closure of $F_2$ energizes the reversing coil REV. of the feed motor thru the plugging switch. The plugging switch plugs the feed motor to a stop by virtue of the reverse current flowing thru the feed motor.

After the opening of switch 134 the trip switch is impulsed in a fashion similar to its actuation in the circuit of FIGURE 5. Closure of the trip switch energizes coil R, which in turn closes hold-in contact $R_1$, and contact $R_2$. In normal operation the trip switch will immediately reopen but the coil R is held in by $R_1$.

Closure of $R_2$ energizes the clutch solenoid 71 and the air valve solenoid. The clutch halves 58 and 51 engage and the hopper rotates 120° in the same manner and at the same rate of acceleration and deceleration as in the FIGURE 5 embodiment. The 120° rotation of the hopper brings the next compartment in line to receive feed. Rotation of the hopper dumps the load and poise bar 18 moves counter-clockwise. Mercoid switch 134 opens on the down swing of the left end of the poise bar. The rotation of the bucket, and consequently the rotation of arm 85, momentarily closes limit switch 89. Since mercoid switch 134 is closed, the forwarding coil is energized and feed commences. As arm 85 swings back to the FIGURE 1 position, limit switch 89 is opened but the forwarding coil is held in by contact $F_1$ which also closed when the forwarding coil was energized.

Energization of the forwording coil opens contact $F_2$ breaking the circuit to the reversing coil, and de-energizing R. Clutch solenoid 71 and the air valve are consequently de-energized by the opening of $R_1$ and $R_2$. The clutch disengages, the rack retracts and the hopper starts to settle.

At a given point during the settling movement of the hopper and poise bar 18, mercoid switch 134 opens and the cycle repeats.

If roller 100 is properly indexed, the interlock switch 105 remains closed.

Although several embodiments of the invention have been illustrated and described, it will at once be apparent to those skilled in the art that various modifications may be made without departing from the spirit and scope of the invention. Accordingly, it is the intention that the scope of the invention should be measured, not by the scope of the exemplary description, but solely by the scope of the appended claims when interpreted in the light of the pertinent prior art.

I claim:

1. A method of quickly and accurately weighing uniform weight batches of material, said method including the steps of
    charging material to be weighed into a material receiving compartment in a multi-compartment receptacle,
    controllably rotating said receptacle that portion of a complete revolution equal to one over the number of compartments in the receptacle by a positive, continuously applied force effective to provide a rate of increase and decrease of speed of rotational movement which is substantially a controlled variation, and
    discharging the material from the compartment.

2. The method of claim 1 further characterized in that the material flows continuously.

3. The method of claim 1 further characterized in that at least the rate of increase of speed of rotational movement of the receptacle is a simple harmonic variation.

4. The method of claim 1 further characterized in that the material is intermittently charged.

5. The method of claim 2 further characterized in that the dwell time between successive increments of movement of the receptacle is momentary.

6. The method of claim 1 further characterized in that initiation of movement of the compartment being charged, and thereby the receptacle, occurs prior to deposition in the compartment of the desired weight of material,
    the time of commencement of rotation being so correlated to the quantity of inflight charging material that the completion of deposit of the desired weight of material will occur by the time access of the charging material to the compartment is closed.

7. The method of claim 1 further characterized in that initiation of movement of the compartment being charged, and thereby the receptacle, occurs prior to disposition in the compartment of the desired weight of material,
    the time of commencement of rotation being so correlated to the quantity of flight material that the completion of deposit of the desired weight of material in the compartment is substantially instantaneous with the termination of access of charging material to the compartment.

8. A repetitive method of weighing, said method including the steps of,
    charging material to be weighed into a compartment in a multi-compartment receptacle,
    controllably rotating said receptacle that portion of a complete revolution equal to one over the number of compartments in the receptacle by a positive, continuously applied force effective to provide a rate of increase and decrease of speed of rotational movement which is substantially a controlled variation, and,
    discharging the material from the compartment, and commencing charging of material into the next succeeding compartment prior to initiating the next rotative movement.

9. The repetitive method of weighing of claim 8 further characterized in that the rate of increase and decrease of speed of rotation of the receptacle is substantially a function of simple harmonic motion.

10. The repetitive method of weighing of claim 8 further characterized in that rotation of the receptacle increases from a minimal velocity to a peak velocity, and then decreases from the peak velocity to the minimal velocity at the termination of rotation.

11. Apparatus for quickly and accurately weighing uniform weight batches of material repetitively, said apparatus including, in combination,
    a frame,
    a center pivot and means supporting the center pivot from the frame,
    a lever supported by the center pivot,
    counterbalance means carried by the lever on one side of the center pivot,
    a multi-compartment rotatable material receptacle carried by the lever on the other side of the center pivot, and
    means for controllably rotating the receptacle by a positive, continuously applied force for that portion of a revolution equal to one over the number of compartments in the receptacle from a starting velocity to a peak velocity and then from the peak velocity to a termination velocity.

12. The apparatus of claim 11 further including means for co-ordinating rotation of the receptacle with the quantity of materal deposited in one of the compartments of the receptacle.

13. The apparatus of claim 11 further including means for initiating rotation of the receptacle upon the deposition of a predetermined weight of material in one of the compartments of the receptacle.

14. The apparatus of claim 11 further characterized in that the means for rotating the receptacle includes structure for imparting a simple harmonic motion variation to the rate of acceleration and deceleration.

15. The apparatus of claim 11 further including pivot means for supporting the material receptacle from the said other side of the center pivot.

16. The apparatus of claim 15 further including a check rod system of counter-balance weights to accommodate off center loads in the receptacle.

17. The apparatus of claim 11 further characterized in that the receptacle rotating means includes clutch means engageable with the receptacle in co-ordination with deposition of a given quantity of material in the receptacle,
    a mechanical linkage associated with the clutch means effective to rotate the clutch, and thereby the receptacle, that portion of a revolution equal to 1 over the number of compartments in the receptacle whereby the material in the compartment is discharged and
    means for disengaging the clutch means whereby the receptacle may return to its initial position and the mechanical linkage to its initial position preparatory to re-engagement of the clutch means with the receptacle.

18. In an apparatus for quickly and accurately weighing uniform weight batches of material, the combination of
    a rotary, multi-compartment receptacle,
    means for controllably rotating the receptacle by a positive, continuously applied force for that portion of a revolution equal to one over the number of compartments in the receptacle from a starting velocity to a peak velocity and then from the peak velocity to a termination velocity, and a control system which includes a first circuit which initiates, upon reception of a signal, operation of a motor which controls charging of material into said receptacle, a second circuit, activated in response to the deposition of a pre-determined weight of material in the receptacle, which initiates operation of the aforesaid means for controllably rotating the receptacle to thereby discharge said pre-determined weight of material from the receptacle, means, responsive to the dumping of the predetermined weight of material from the receptacle for interrupting the first circuit, and thereby charging of material into the receptacle, means for resetting the first circuit in preparation for another signal, and a circuit operable to brake the motor for a short period of time subsequent to the interruption of charging of material into the receptacle.

19. Apparatus for quickly and accurately weighing uniform weight batches of material repetitively, said apparatus including, in combination, a frame, a center pivot and means supporting the center pivot from the frame, a lever supported by the center pivot, counterbalance means carried by the lever on one side of the center pivot, a multi-compartment rotatable material receptacle carried by the lever on the other side of the center pivot, and means for controllably rotating the receptacle that portion of a revolution equal to one over the number of compartments in the receptacle with acceleration to a peak velocity, and then deceleration to a minimum velocity, said means for rotating including a control system which comprises, a first circuit which initiates, upon reception of a signal, operation of a motor which controls charging of material into said weigher, a second circuit, activated in response to the deposition of a pre-determined weight of material in the weigher, which initiates mechanism for discharging said pre-determined weight of material from the weigher, means, responsive to the dumping of the pre-determined weight of material from the weigher, for interrupting the first circuit, and thereby charging of material into the weigher, and means for resetting the first circuit in preparation for another signal.

20. The apparatus of claim 11 further including cam means for locking the lever against the frame at the conclusion of each increment of rotation of the receptacle.

21. The apparatus of claim 17 further including cam means for momentarily locking the lever against the frame at the conclusion of each increment of rotation of the receptacle, said cam means being associated with the clutch means and being effective only when the clutch means is in engagement to control the position of the lever.

22. The apparatus of claim 17 further characterized in that the clutch means includes two clutch halves, one clutch half being carried by, and rotatable with, the receptacle, the other clutch half being carried by, and rotatable about, an axis fixed with respect to the frame, said other clutch half having a cam surface formed thereon which bears against a bearing surface fixed with respect to the frame during engaged rotation of the clutch.

23. The apparatus of claim 22 further characterized in that the bearing surface rotates about a stationary axis.

24. In a weighing apparatus, a multi-compartment rotary hopper, a supporting structure for the hopper, means for imparting a continuously applied, controlled force to the hopper for a period of time sufficient to rotate the hopper that portion of a complete path of travel equal to one over the number of compartments in the hopper, and means for disconnecting the controlled force from the hopper during dwell periods, and means for connecting the force imparting means to the hopper only during rotative movement of the hopper to thereby maintain friction and wear in the system at a minimum.

References Cited by the Examiner

UNITED STATES PATENTS

| | | | |
|---|---|---|---|
| 1,556,308 | 10/1925 | Zepp | 177—86 X |
| 1,615,485 | 1/1927 | Rees | 177—85 X |
| 1,724,889 | 8/1929 | Tomlinson | 177—86 |
| 2,470,427 | 5/1949 | Brodie | 177—85 |
| 2,548,075 | 4/1951 | Stoker | 177—82 |
| 2,597,120 | 5/1952 | McCargar | 177—84 |
| 2,613,905 | 10/1952 | Muskat | 177—85 |

FOREIGN PATENTS 257,540   3/1913   Germany.

LEO SMILOW, *Primary Examiner.*